(12) United States Patent
You

(10) Patent No.: US 12,465,622 B2
(45) Date of Patent: Nov. 11, 2025

(54) METHOD OF MANUFACTURING DIABETIC FOOT PATIENT-SPECIFIC DERMAL REGENERATION SHEET AND DIABETIC FOOT PATIENT-SPECIFIC DERMAL REGENERATION SHEET MANUFACTURED USING THE SAME

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 1153 days.

(21) Appl. No.: 16/630,684

(22) PCT Filed: Oct. 22, 2019

(86) PCT No.: PCT/KR2019/013856
§ 371 (c)(1),
(2) Date: Jan. 13, 2020

(87) PCT Pub. No.: WO2021/071001
PCT Pub. Date: Apr. 15, 2021

(65) Prior Publication Data
US 2021/0401897 A1    Dec. 30, 2021

(30) Foreign Application Priority Data

Oct. 8, 2019   (KR) ........................ 10-2019-0124693

(51) Int. Cl.

| | | |
|---|---|---|
| *A61K 35/35* | (2015.01) | |
| *A61K 9/00* | (2006.01) | |
| *A61K 9/70* | (2006.01) | |
| *A61K 35/15* | (2025.01) | |
| *A61K 35/17* | (2025.01) | |
| *A61K 35/28* | (2015.01) | |
| *A61K 35/36* | (2015.01) | |
| *A61K 35/44* | (2015.01) | |
| *A61K 38/20* | (2006.01) | |
| *A61K 38/22* | (2006.01) | |
| *A61K 38/28* | (2006.01) | |
| *A61K 38/30* | (2006.01) | |
| *A61K 38/36* | (2006.01) | |
| *A61K 38/48* | (2006.01) | |
| *A61P 3/10* | (2006.01) | |
| *A61P 17/02* | (2006.01) | |
| *C07K 14/52* | (2006.01) | |
| *C07K 14/54* | (2006.01) | |
| *C07K 14/78* | (2006.01) | |
| *C12N 5/077* | (2010.01) | |
| *C07K 14/81* | (2006.01) | |

(52) U.S. Cl.
CPC ............ *A61K 35/35* (2013.01); *A61K 9/0014* (2013.01); *A61K 9/7007* (2013.01); *A61K 35/15* (2013.01); *A61K 35/17* (2013.01); *A61K 35/28* (2013.01); *A61K 35/36* (2013.01); *A61K 35/44* (2013.01); *A61K 38/2006* (2013.01); *A61K 38/204* (2013.01); *A61K 38/2264* (2013.01); *A61K 38/28* (2013.01); *A61K 38/30* (2013.01); *A61K 38/363* (2013.01); *A61K 38/4833* (2013.01); *A61P 3/10* (2018.01); *A61P 17/02* (2018.01); *C12N 5/0653* (2013.01); *C07K 14/521* (2013.01); *C07K 14/54* (2013.01); *C07K 14/78* (2013.01); *C07K 14/8125* (2013.01); *C07K 2299/00* (2013.01)

(58) Field of Classification Search
None
See application file for complete search history.

(56) References Cited

U.S. PATENT DOCUMENTS

2021/0038762 A1    2/2021   You

FOREIGN PATENT DOCUMENTS

| CN | 206027182 U | 3/2017 | |
|---|---|---|---|
| EP | 1638507 B1 | 3/2017 | |
| JP | 10291937 A | * 11/1998 | |
| JP | 2018-523559 A | 8/2018 | |
| KR | 2003-0043313 A | 6/2003 | |
| KR | 2006-0025180 A | 3/2006 | |
| KR | 20110032513 A | 3/2011 | |
| KR | 20140147805 A | 12/2014 | |
| KR | 20160025180 A | 3/2016 | |
| KR | 2017-0107289 A | 9/2017 | |
| KR | 2019-0098907 A | 8/2019 | |
| KR | 20190098904 A | 8/2019 | |
| WO | 2009154840 A2 | 12/2009 | |
| WO | WO-2012019103 A2 | * 2/2012 | ........ A61M 5/14526 |
| WO | 2019/136455 A1 | 7/2019 | |
| WO | 2019/151611 A1 | 8/2019 | |

OTHER PUBLICATIONS

Tsuji et al., World J. Stem Cells 6:312-321 (2014) (Year: 2014).*
Gadelkarim et al., Biomed. & Pharmacother. 107:625-633 (2018) (Year: 2018).*
Ross, Podiatry Today, available online at www.hmpglobal-learningnetwork.com/site/podiatry/scanning-technology-and-orthotic-casting-what-you-should-know, 12 pages (2018) (Year: 2018).*
"Curing", Corrosionpedia, available online at www.corrosionpedia.com/definition/354/curing, 11 pages (2019) (Year: 2019).*
Breau, Micron Solutions, available online at www.micronsolutions.com/blog/3d-printing-manufacturing-process, 5 pages (2017) (Year: 2017).*
Janmey et al., J. R. Soc. Interface 6:1-10 (2009) (Year: 2009).*
Chavez-Munoz et al., PlosOne 8:13 pages (2013) (Year: 2013).*

(Continued)

*Primary Examiner* — Thea D'Ambrosio
(74) *Attorney, Agent, or Firm* — Osha Bergman Watanabe & Burton LLP

(57) ABSTRACT

The specification relates to a method of manufacturing a diabetic foot patient-specific skin regeneration sheet, and a diabetic foot patient-specific skin regeneration sheet.

9 Claims, 3 Drawing Sheets

(56) References Cited

OTHER PUBLICATIONS

English language machine translation for JP-10291937-A, (accessed on Feb. 17, 2023) (Year: 2023).*
BioTechniques 53:109-111 (2012) (Year: 2012).*
Amirrah et al., Biomedicines 10:44 pages (2022) (Year: 2022).*
International Search Report issued in corresponding International Application No. PCT/KR2019/013856, mailed on Jul. 7, 2020 (7 pages).
Extended European Search Report issued in EP Application No. 19828950.6 dated Oct. 11, 2021 (9 pages).
Singh, Satnam et al. "In situ bioprinting—Bioprinting from benchside to bedside?" Acta Biomaterialia, vol. 101, Aug. 30, 2019, pp. 14-25 (12 pages).
CSL Behring, Beriplast P Combi-Set 0,5/1/3ml, Mar. 2024, with translation (14 pages).
Office Action issued in corresponding Chilean Patent Application No. 202001416, dated Feb. 28, 2023, with translation (24 pages).
Office Action issued in corresponding Russian Patent Application No. 2020101613/04(002374), dated Mar. 16, 2023, with translation (26 pages).

\* cited by examiner

[Fig. 1]
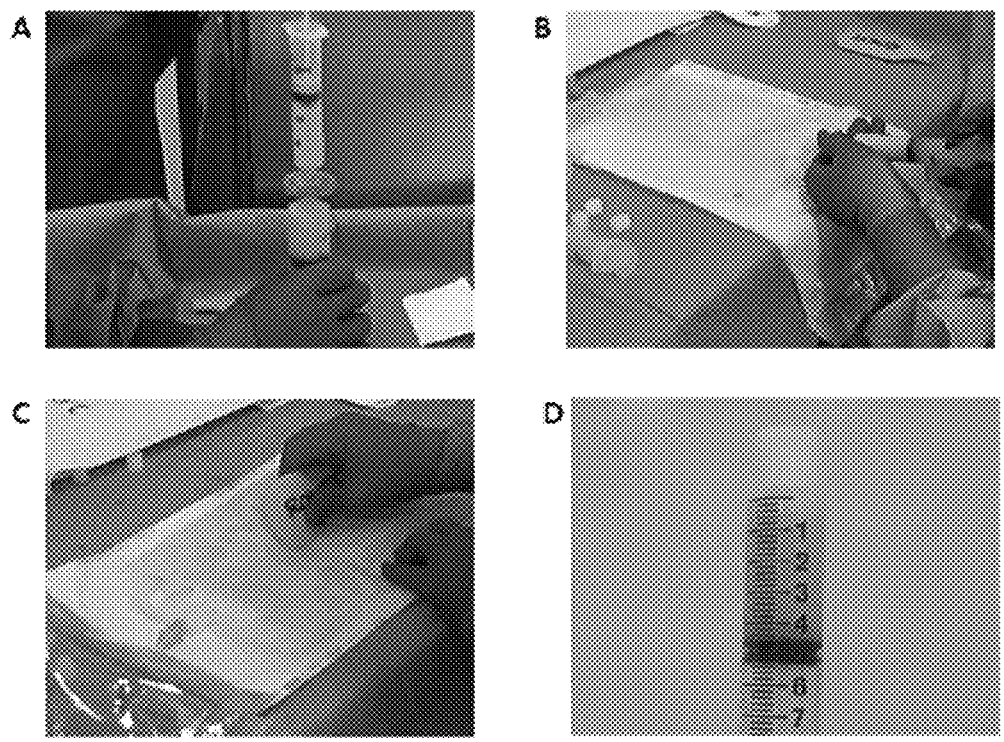

[Fig. 2]
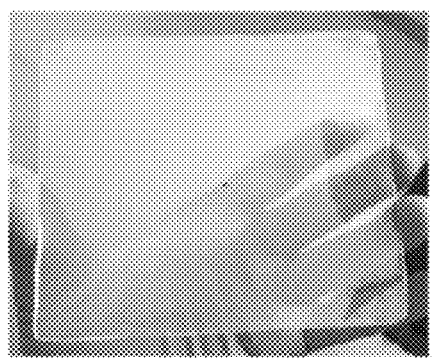
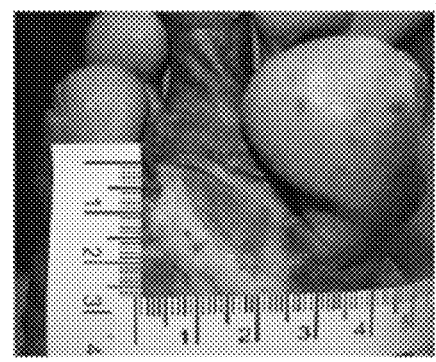
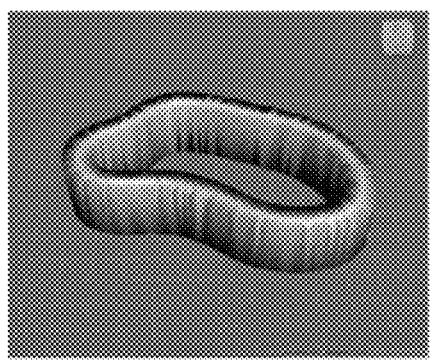
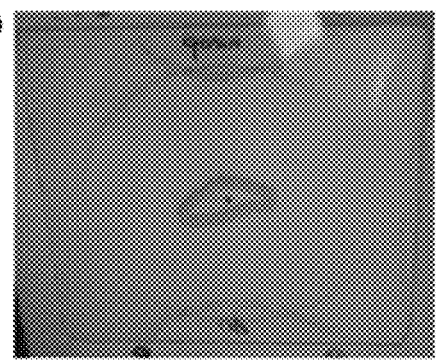

[Fig. 3]
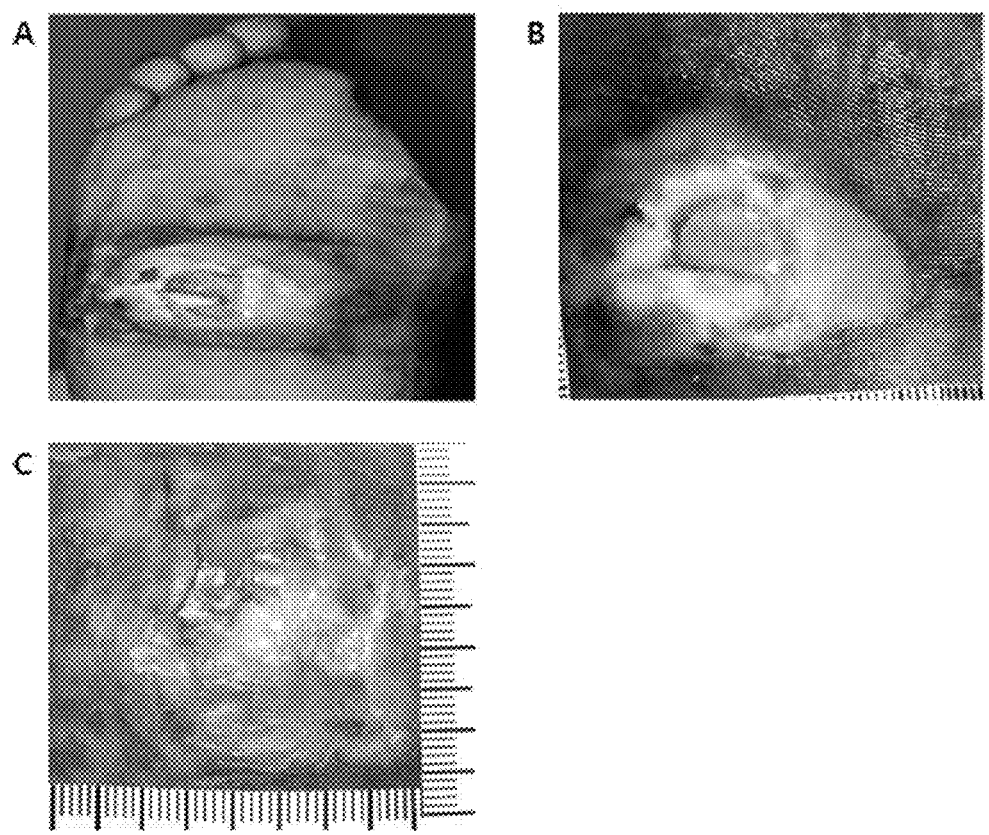

METHOD OF MANUFACTURING DIABETIC FOOT PATIENT-SPECIFIC DERMAL REGENERATION SHEET AND DIABETIC FOOT PATIENT-SPECIFIC DERMAL REGENERATION SHEET MANUFACTURED USING THE SAME

TECHNICAL FIELD

The present invention relates to a method of manufacturing a diabetic foot patient-specific skin regeneration sheet and a diabetic foot patient-specific skin regeneration sheet manufactured using the same.

BACKGROUND ART

Diabetic foot syndrome is ulceration of feet caused by the damage to skin tissue due to skin cuts, particularly, in feet of a person with diabetes mellitus. This is a phenomenon caused by a foot ulcer resulting from neuropathy or a peripheral vascular disease caused by diabetes mellitus or a worsening wound infection in a diabetic patient. Approximately 20% of patients with diabetes mellitus have diabetic foot syndrome at least once, and approximately 1 to 3% of the patients have partial leg amputations.

In addition, it has been known that, except for trauma, more than half of the partial leg amputations result from diabetic foot syndrome. As such, since diabetic foot syndrome is a major cause of degrading the quality of the life of a diabetic patient, a means for treating such syndrome is required. Particularly, studies for restoring skin tissue in a necrotic area caused by diabetic foot syndrome to enable normal lives are demanded.

DISCLOSURE

Technical Problem

The specification is directed to providing a method of manufacturing a diabetic foot patient-specific skin regeneration sheet which may restore skin in a necrotic lesion of a diabetic foot patient to normal skin, and a diabetic foot patient-specific skin regeneration sheet manufactured using the same.

Technical Solution

One aspect of the present invention provides a method of manufacturing a diabetic foot patient-specific skin regeneration sheet, which includes: A) extracting autologous adipose tissue; B) removing fibers in the autologous adipose tissue using a first filter having a pore diameter of 2 to 3 mm; C) crushing the autologous adipose tissue from which the fibers are removed by sequentially passing it through a second filter having a pore diameter of 450 to 550 μm and a third filter having a pore diameter of 150 to 250 μm; D) acquiring an adipose tissue extract by extracting the ground autologous adipose tissue collected on a fourth filter having a pore diameter of 25 to 75 μm; E) obtaining 3D data of the skin defect area of a patient using a 3D scanner, and then based on the data, manufacturing a 3D mold corresponding to the skin defect area using a 3D printer; F) forming a proto-layer by applying a first solution containing the adipose tissue extract and fibrinogen to the inside of the 3D mold; G) curing the proto-layer into a skin regeneration layer by applying a second solution containing thrombin onto the proto-layer; and H) removing the 3D mold.

Another aspect of the present invention provides a diabetic foot patient-specific skin regeneration sheet manufactured using the above-described method.

Advantageous Effects

A method of manufacturing a diabetic foot patient-specific skin regeneration sheet according to the present invention rapidly manufactures a skin regeneration sheet suitable for a diabetic foot patient so that high cell activity and the skin regeneration promoting effect of a cell growth factor can be expected, resulting in the effective restoration of an affected area.

According to the method of manufacturing a diabetic foot patient-specific skin regeneration sheet according to the present invention, a skin regeneration sheet with a shape matching the affected area of a diabetic foot patient (that is, a shape with the same shape and depth) can be manufactured, thereby more effectively restoring the affected area.

Other objects and advantages of the present invention can be more clearly understood with reference to the detailed description, claims and drawings below.

DESCRIPTION OF DRAWINGS

FIG. 1 shows a stepwise process of acquiring an adipose tissue extract according to an exemplary embodiment.

FIG. 2 shows a process of manufacturing a patient-specific 3D mold according to an exemplary embodiment.

FIG. 3 shows a process of applying a patient-specific skin regeneration sheet to a diabetic foot patient according to an exemplary embodiment and a result thereof.

MODES OF THE INVENTION

In the specification, when one member is disposed "on" another member, the first member is in contact with the second member, or a third member is interposed between the two members.

In the specification, when one part "comprises," "includes," or "has" a component, unless particularly mentioned otherwise, another component may be further included, not excluding other components.

Hereinafter, the present invention will be described in detail.

In one exemplary embodiment, the present invention provides a method of manufacturing a diabetic foot patient-specific skin regeneration sheet, which includes:

A) extracting autologous adipose tissue;

B) removing fibers in the autologous adipose tissue using a first filter having a pore diameter of 2 to 3 mm;

C) crushing the autologous adipose tissue from which the fibers are removed by sequentially passing it through a second filter having a pore diameter of 450 to 550 μm and a third filter having a pore diameter of 150 to 250 μm;

D) acquiring an adipose tissue extract by extracting the ground autologous adipose tissue collected on a fourth filter having a pore diameter of 25 to 75 μm;

E) obtaining 3D data of the skin defect area of a patient using a 3D scanner, and then based on the data, manufacturing a 3D mold corresponding to the skin defect area using a 3D printer;

F) forming a proto-layer by applying a first solution containing the adipose tissue extract and fibrinogen to the inside of the 3D mold;

G) curing the proto-layer into a skin regeneration layer by applying a second solution containing thrombin onto the proto-layer; and H) removing the 3D mold.

Hereinafter, each step of the method of manufacturing a diabetic foot patient-specific skin regeneration sheet will be described in detail.

Step A): Extraction of Autologous Adipose Tissue

The step A) may be to extract autologous adipose tissue of a diabetic foot patient using general liposuction. Specifically, the autologous adipose tissue in Step A) may be obtained by removing saline used in liposuction and blood mixed with the adipose tissue from the extract obtained by liposuction.

According to an exemplary embodiment of the present invention, Step A) may be to extract autologous adipose tissue by removing blood and physiological saline contained in the extract acquired by liposuction. Specifically, in Step A), the extract acquired by liposuction may be left for a predetermined time to allow blood and physiological saline to be separated from the adipose layer, and then the blood and the physiological saline may be filtrated, thereby extracting autologous adipose tissue. As described above, when blood and physiological saline are removed, the following adipose tissue extract may be extracted more effectively, and the extracted adipose tissue extract may more effectively contain a growth factor and active cells, which are suitable for treatment.

Step B): Removal of Fibers in Autologous Adipose Tissue

Step B) is to remove fibers in the extracted autologous adipose tissue using a first filter having a relatively large pore diameter. Specifically, the first filter in Step B) may be a syringe filter formed of stainless steel. Specifically, since the first filter has a filter part formed of stainless steel with high strength, fibers may be effectively separated from the autologous adipose tissue. More specifically, in Step B), a syringe may be installed at both ends of the first filter, and the extracted autologous adipose tissue may pass through the first filter two times or more using the piston movement of the syringe, specifically, two to three times. In Step B), first, fibers in the autologous adipose tissue are filtrated to more effectively and rapidly crush the autologous adipose tissue.

Step C): Crushing of Autologous Adipose Tissue

Step C) may include crushing the autologous adipose tissue by passing the fiber-removed autologous adipose tissue through the second filter, and additionally crushing the autologous adipose tissue by passing the filtrate thereof through the third filter.

According to an exemplary embodiment of the present invention, Step C) may be to crush the fiber-removed autologous adipose tissue by injecting the fiber-removed autologous adipose tissue into a filter bag, and passing the tissue through a filter by applying an external pressure. Specifically, in Step C), the fiber-removed autologous adipose tissue may be injected into a filter bag, and then outside the filter bag, a tool such as a silicone spatula may be used to sequentially pass the fiber-removed autologous adipose tissue through the second filter and the third filter to crush the autologous adipose tissue.

In the specification, the filter bag, which is a closed pouch-shape filter kit formed of flexible plastic, has an inlet at one side and an outlet at the other side, and an inner space divided by filters.

For example, the second and third filters in Step C) may be used by modifying a filter bag of a Lipocell kit manufactured by Tiss'you. However, the present invention is not limited thereto, and filters suitable for the purpose of the present invention can be used.

As described in Step C), when the autologous adipose tissue is crushed using filters with gradually reduced pore diameters, the time for more finely crushing the autologous adipose tissue may be greatly reduced, and cells in the adipose tissue extract may retain high cell activity. Specifically, according to Step C), although the adipose tissue is finely crushed by a physical method, large amounts of adipose tissue, active cells and active proteins effective for treatment may be effectively obtained. Further, according to Step C), an extracellular matrix and growth factors can be collected in an optimal active state, and physical properties for accomplishing (3D) bioprinting may be acquired.

D) Acquirement of Adipose Tissue Extract

Step D) is to filtrate the autologous adipose tissue crushed in Step C) through the fourth filter, and then acquire a material collected on the filter after disposing of the filtrate. Specifically, in Step D), after the autologous adipose tissue crushed in Step C) is mixed with physiological saline, the mixture may be filtrated through the fourth filter to separate and remove the filtrate, and the material collected on the fourth filter may be used as an adipose tissue extract. The material removed by filtration may be excessively finely crushed, and thus may contain adipose tissue with reduced cell activity, blood or the physiological saline, which may hinder the activity of a final skin regeneration sheet intended by the present invention and therefore has to be removed.

Step D) may be to remove the material filtrated through the fourth filter after the fiber-removed autologous adipose tissue and physiological saline are injected into a filter bag. Specifically, in Step D), the fiber-removed autologous adipose tissue and physiological saline may be injected into a filter bag, and then the crushed autologous adipose tissue may be filtrated through the fourth filter by applying a suitable pressure.

For example, the fourth filter in Step D) may be used by modifying a filter bag of a Lipocell kit manufactured by Tiss'you. However, the present invention is not limited thereto, and a filter suitable for the purpose of the present invention may be used.

Particularly, the adipose tissue extract prepared according to the present invention may abundantly contain growth factors, active cells and active proteins, which are required for skin restoration of a diabetic foot patient. Further, since a bioprinting composition (e.g., first solution) using the adipose tissue extract may be maintained at a suitable viscosity and discharged at a constant rate without clogging a nozzle during bioprinting, the composition is suitable for manufacturing a skin regeneration sheet requiring precise bioprinting.

In addition, as the adipose tissue extract may be rapidly extracted while containing the maximum amount of growth factors, active cells and active proteins, more effective treatment is possible.

Step E): Manufacture of 3D Mold Corresponding to Skin Defect Area

Step E) may use 3D scanning or printing equipment, which is known in the art. Further, the 3D mold may maintain the three-dimensional structure (that is, shape, size, depth, etc.) of an affected area during the application of the first solution and the second solution, and may be removed after the skin regeneration sheet is manufactured. The 3D mold may be formed using a biocompatible polymer generally used in the art. Specifically, the 3D mold may be manufactured using PCL. Since the PCL has a low melting point and high flexibility, it may be easily separated from the manufactured skin regeneration sheet. Further, the PCL may be used to produce an optimal mold suitable for the three-dimensional structure of the affected area, and the skin regeneration sheet manufactured using a 3D mold which has the same three-dimensional structure as the affected area may be effectively adhered to the affected area to help in skin restoration.

Step F): Formation of Proto-Layer

Step G): Curing as Skin Regeneration Layer

In the specification, a proto-layer may refer to a layer formed by applying a biocomposition which has not been cured. Specifically, the proto-layer may refer to a layer which is applied to the inside of the 3D mold and not yet cured by a composition containing thrombin.

Step F) and Step G) may be performed using inkjet bioprinting or 3D bioprinting, respectively. Specifically, in Step F) and Step G), a bioprinting device having two or more nozzles, which is known in the art, may be used and the first solution and the second solution may be discharged from respective nozzles so as to form a three-dimensional structure. Further, when a 3D bioprinter or inkjet bioprinter is used during the formation of the proto-layer, cells and an extracellular matrix may be distributed homogeneously, and cell aggregation in the skin regeneration layer after curing may be prevented.

According to an exemplary embodiment of the present invention, in Step G), curing may be accomplished within 30 seconds to 5 minutes, and specifically, 10 seconds to 1 minute.

According to an exemplary embodiment of the present invention, Step B) to Step G) may be accomplished within 30 minutes. Specifically, Step B) to Step G) may be accomplished within 1 to 15 minutes or 1 to 5 minutes after adipose tissue extraction.

When the manufacturing method is used, after autologous adipose tissue is extracted, a patient-specific skin regeneration sheet may be very rapidly manufactured, so that the activity of cells and an extracellular matrix in the patient-specific skin regeneration sheet may be maximized.

Step H): Removal of 3D Mold

Step H) may be to separate a diabetic foot patient-specific skin regeneration sheet (selectively including the following epidermal regeneration layer) including a skin regeneration layer from the 3D mold. The diabetic foot patient-specific skin regeneration sheet removed from the 3D mold may be attached to the skin defect area of a diabetic foot patient to maximize the skin regenerative effect of the affected area.

First Solution and Second Solution

The first solution may contain an adipose tissue extract and fibrinogen. The adipose tissue extract may include an adipose-derived stromal vascular fraction and an adipose-derived extracellular matrix. The adipose-derived stromal vascular fraction may include adipose-derived stem cells. The adipose-derived stromal vascular fraction may differentiate into skin tissue in the affected area of a diabetic foot patient to help in the restoration of the affected area along with the adipose-derived extracellular matrix. The adipose-derived extracellular matrix may provide an environment in which the cells differentiating into skin tissue in the affected area of the diabetic foot patient may be fixed.

According to an exemplary embodiment of the present invention, the first solution may contain at least one selected from the group consisting of insulin, insulin-like growth factors, granulocytes, lymphocytes, endothelial cells, monocytes, macrophages, adipose-derived stem cells, adipocytokines, adiponectin, leptin, IL-6, IL-1β, MCP-1 and PAI-1. Specifically, the first solution may contain a higher content of insulin than the insulin concentration in the affected area of the diabetic foot patient, or insulin-like growth factors, and therefore the affected area may be effectively restored by compensating for the deficiency of insulin supply caused by the necrosis of capillaries in the affected area of the diabetic foot patient.

The fibrinogen in the first solution may react with the thrombin in the second solution, thereby forming a fibrin-fibrin network, which may serve to sufficiently fix active cells in the skin regeneration layer.

According to an exemplary embodiment of the present invention, the fibrinogen in the first solution may be a 40% to 60% dilution of 60 IU fibrinogen.

In addition, according to an exemplary embodiment of the present invention, the thrombin in the second solution may be a 40% to 60% dilution of 500 IU thrombin.

When the fibrinogen and thrombin concentrations exceed the above-mentioned ranges, the content of fibrin glue in the skin regeneration layer is excessively high, so that the differentiation into skin cells may not be effective, and cell viability may be lowered. Further, due to an excessively high hardness of the skin regeneration layer, compatibility with the affected area may be lowered. Moreover, when the fibrinogen and thrombin concentrations are less than the above range, the hardness of the skin regeneration layer is excessively low, making handling difficult, and when the flowability of the manufactured skin regeneration sheet is excessively high, the sheet may not be effectively applied to the affected area. That is, when the fibrinogen and thrombin concentrations are in the above-mentioned ranges, the manufactured skin regeneration sheet may exhibit the highest cell viability, and may be maximally effective when applied to the affected area due to suitable hardness and flowability. Further, the distribution of proteins and active cells in the skin regeneration sheet may be uniformly maintained, and thus the affected area can be effectively treated.

According to an exemplary embodiment of the present invention, the first solution may further include aprotinin. The aprotinin, which is an inhibitor of a protease secreted from the pancreas, is a polypeptide consisting of a total of 58 amino acids. The aprotinin is usually extracted from a bovine lung, and is known to have a homeostatic action by hindering fibrin degradation in blood.

According to an exemplary embodiment of the present invention, the aprotinin may be included at 900 to 1,100 kininogen inactivator units (KIU), and specifically, 1000 KIU per 1 ml of the first solution.

According to an exemplary embodiment of the present invention, the second solution may be prepared by dispersing thrombin in a calcium chloride solution. Specifically, the second solution may include 5 to 6.5 mg of calcium chloride.

The solvent of the first solution and the second solution may be water, and specifically, physiological saline. In addition, the fibrinogen in the first solution and the thrombin in the second solution may be obtained from a commercial fibrin glue kit.

The present invention uses a fibrin glue consisting of fibrinogen and thrombin as an adhesive, which is able to have a higher viscosity than a hyaluronic acid adhesive or collagen adhesive, so that the skin regeneration layer may have an excellent adhesive strength to the affected area, and maintain a proper strength.

According to an exemplary embodiment of the present invention, the volume ratio of the adipose tissue extract to the fibrinogen in the first solution may be 3:1 to 5:1. When the volume ratio of the adipose tissue extract and the fibrinogen in the first solution is in the above-mentioned range, the strength and cell differentiation capacity of the manufactured skin regeneration sheet may be most effectively realized.

Skin Regeneration Layer

According to an exemplary embodiment of the present invention, the skin regeneration layer may include finely crushed adipose-derived cells and active factors in a fibrin matrix. Specifically, the skin regeneration layer may include various cells and/or active factors, in addition to the adipose-derived extracellular matrix and the adipose-derived stromal vascular fraction.

Epidermal Regeneration Layer

According to an exemplary embodiment of the present invention, the method may further include forming an additional proto-layer by applying an additional first solution containing an adipose tissue extract, fibrinogen and keratinocytes onto the skin regeneration layer, and then applying an additional second solution containing thrombin onto the additional proto-layer to cure the proto-layer into an epidermal regeneration layer. The additional first solution and the additional second solution may be applied to the inside of the 3D mold by the same method as the above-described method of applying the first solution and the second solution.

According to an exemplary embodiment of the present invention, the additional first solution may contain an adipose tissue extract, fibrinogen and keratinocytes, which may be prepared by adding keratinocytes to the above-described first solution. In addition, the additional second solution may be the same as the above-described second solution.

The additional first solution may be applied onto the cured skin regeneration layer, thereby forming an additional proto-layer, and the additional second solution may be applied onto the additional proto-layer to be cured into a skin regeneration layer.

That is, the epidermal regeneration layer may include finely-crushed adipose-derived cells and active factors in the fibrin matrix like the above-described skin regeneration layer, and further include keratinocytes.

The epidermal regeneration layer may be incorporated as a part of the diabetic foot patient-specific skin regeneration sheet, and particularly, located at the outermost surface of the affected area to more effectively help epidermal regeneration in the affected area. Specifically, the skin regeneration layer may effectively help in restoring the affected area, and the epidermal regeneration layer may be located at the outermost surface of the affected area to help in restoring the epidermal layer of the affected area, resulting in fast restoration.

Diabetic Foot Patient-Specific Skin Regeneration Sheet

According to still another exemplary embodiment of the present invention, a diabetic foot patient-specific skin regeneration sheet manufactured using the above-described manufacturing method is provided. The diabetic foot patient-specific skin regeneration sheet may consist of the above-described skin regeneration layer alone, or include both of the above-described skin regeneration layer and epidermal regeneration layer.

According to an exemplary embodiment of the present invention, the thickness of the diabetic foot patient-specific skin regeneration sheet may be at least 1 mm. Specifically, when the thickness of the diabetic foot patient-specific skin regeneration sheet is less than 1 mm, skin cells may not be regenerated from a dermal layer, resulting in the delay of the restoration of the affected area, or a non-uniform surface of the restored skin. More specifically, the thickness of the diabetic foot patient-specific skin regeneration sheet may be 1 to 10 mm, or 1 to 5 mm.

Hereinafter, the present invention will be described in detail with reference to an example to explain the present invention in detail. However, the example according to the present invention may be modified into a variety of different forms, and it should not be construed that the scope of the present invention is not limited to the following example. The example of the present invention is provided to more completely explain the present invention to those of ordinary skill in the art.

Example (1) Acquirement of Adipose Tissue Extract

After anesthetizing a diabetic foot patient, 70 to 150 ml of a liquid was extracted from the abdomen of the diabetic foot patient by liposuction and left for approximately 5 minutes, and then physiological saline and blood mixed with the adipose tissue were allowed to settle to remove the precipitate, thereby obtaining autologous adipose tissue.

And then, a syringe containing the patient's fat and a fresh syringe were installed at a bidirectional inlet of a connector having a stainless-steel syringe filter (Adnizer, SKT-AN-2400, BSL) with a pore diameter of 2.4 mm, and fibers were removed from autologous adipose tissue by passing the adipose through the filter two or three times by movement of a piston.

Afterward, the fiber-removed adipose was injected into a filter bag (Adipose tissue processing device, Tiss'you) having a PET filter with a pore diameter of 500 μm, followed by filtration using a silicone spatula. Subsequently, using a filter bag (Adipose tissue processing device, Tiss'you) having a PET filter with a pore diameter of 200 μm, the adipose which had passed through the 500 μm filter was filtrated by the same method as described above. Afterward, the adipose which had passed through the 200 μm filter was injected, along with the same amount of physiological saline, into a filter bag (Adipose tissue processing device, Tiss'you) having a PET filter with a pore diameter of 50 μm, and then the physiological saline and other impurities were removed, thereby obtaining an adipose tissue extract.

FIG. 1 shows a stepwise process of acquiring an adipose tissue extract according to an exemplary embodiment. Specifically, FIG. 1A shows a process of removing fibers from autologous adipose tissue using a syringe filter. FIGS. 1B and 1C show that the fiber-removed autologous adipose tissue is injected into a filter bag, and then a silicone spatula is used to pass the autologous adipose tissue through a filter. FIG. 1D shows the finally obtained adipose tissue extract.

(2) Preparation of First Solution and Second Solution

A fibrinogen (60 IU) solution and a thrombin (500 IU) solution of a Beriplast kit (Beriplast P Combi-Set, CSL Behring L.L.C.) were diluted 50% with physiological saline.

The 50% diluted fibrinogen solution and the adipose tissue extract were mixed in a volume ratio of 1:4, thereby preparing a first solution. In addition, the 50% diluted thrombin solution was used as a second solution.

(3) Manufacture of Patient-Specific 3D Mold

The center of a steam-sterilized 10 cm×10 cm latex-attached glass plate was marked with a dot. In addition, one sheet of a dialysis membrane was cut in a square shape 1 to 2 mm larger than an affected area of the patient, soaked in physiological saline, and attached to the center of the latex-attached glass plate. The center of the glass plate was located at the center of a 3D bioprinter bed (INVIVO, ROKIT HEALTHCARE) to level the glass plate bed. Subsequently, to produce a PCL 3D mold suitable for the shape and size of the affected area, the morphology of the affected area was photographed, and converted into a 3D modeling file. Afterward, the 3D modeling file was input to the 3D bioprinter (INVIVO, ROKIT HEALTHCARE), 1 to 2 g of a medical-grade PCL (RESOMER C 209, EVONIK, MW 45,000) was put into an air-dispenser of the 3D bioprinter (INVIVO, ROKIT HEALTHCARE), and then a 3D mold was printed under conditions of a temperature of 80 to100° C. and a pressure of 600 to 800 kPa.

FIG. 2 shows a process of manufacturing a patient-specific 3D mold according to an exemplary embodiment. Specifically, FIG. 2A is a latex-attached glass plate, to which a dialysis membrane is attached. FIG. 2B shows the affected area of the diabetic foot patient, and FIG. 2C is a 3D modeling result of the affected area of the patient. Further, FIG. 2D shows the finally-manufactured patient-specific 3D mold.

(4) Manufacture of Patient-Specific Skin Regeneration Sheet

The printed 3D mold was placed in a 3D bioprinter (INVIVO, ROKIT HEALTHCARE) in the center of the 3D bioprinter bed. In addition, the first solution was loaded in Dispenser 1 set to have a nozzle size of 0.5 mm, a printing speed of 10 mm/s, an extrusion rate of 300%, a filling rate of 50% and an outer wall thickness of 0.5 mm, the second solution was loaded in Dispenser 2 set to have a nozzle size of 0.5 mm, a printing speed of 10 mm/s, an extrusion rate of 500% and a filling rate of 70%, the first solution was discharged in the 3D mold and the second solution was immediately discharged therein, followed by curing of the solutions. Afterward, the 3D mold was removed, thereby obtaining a patient-specific skin regeneration sheet.

(5) Application to Diabetic Foot Patient

The affected area of the diabetic foot patient was cleaned, and then thrombin was sufficiently sprayed onto a surface that will be attached to the affected area using a spray-installed syringe. In addition, after the affected area was covered with the patient-specific skin regeneration sheet manufactured as described above and treated by wet dressing, the affected area and the surrounding thereof were protected using sponge foam. In addition, the progress was observed by changing the dressing on the affected area every week.

FIG. 3 shows a process of applying a patient-specific skin regeneration sheet to a diabetic foot patient according to an exemplary embodiment and a result thereby. Specifically, FIG. 3A shows the affected area of the diabetic foot patient, and FIG. 3B shows that the manufactured skin regeneration sheet is attached to the affected area. Further, FIG. 3C shows the affected area two weeks after the procedure. According to FIG. 3, when the patient-specific skin regeneration sheet according to the present invention was applied to the affected area of the diabetic foot patient, it can be confirmed that the defect site was rapidly restored. Specifically, referring to FIG. 3C, despite a treatment period of two weeks after the procedure, it can be confirmed that the defect site was 100% restored and thus filled with skin tissue.

As above, specific parts of the present invention have been described in detail. However, it will be apparent to those of ordinary skill in the art that such detailed descriptions are just exemplary embodiments, and thus the scope of the present invention is not limited thereto. Therefore, the actual range of the present invention will be defined by the accompanying claims and equivalents thereof.

The invention claimed is:

1. A method of manufacturing a diabetic foot patient-specific skin regeneration sheet, comprising:
   A) extracting autologous adipose tissue;
   B) removing fibers in the autologous adipose tissue using a first filter having a pore diameter of 2 to 3 mm, retaining the fibers on the first filter and passing the autologous adipose tissue through the first filter;
   C) crushing the autologous adipose tissue from which the fibers are removed by sequentially passing it through a second filter having a pore diameter of 450 to 550 µm and a third filter having a pore diameter of 150 to 250 µm, producing a crushed autologous adipose tissue;
   D) acquiring an adipose tissue extract by filtrating the crushed autologous adipose tissue mixed with a saline solution by a fourth filter having a pore diameter of 25 to 75 µm, acquiring a material collected by the fourth filter to be used as adipose tissue extract, and disposing of the filtrate;
   E) obtaining 3D data of a skin defect area of a patient using a 3D scanner, and then based on the data, manufacturing a 3D mold corresponding to the skin defect area using a 3D printer;
   F) forming a proto-layer by applying a first solution containing the adipose tissue extract and fibrinogen to the inside of the 3D mold;
   G) curing the proto-layer into a skin regeneration layer by applying a second solution containing thrombin onto the proto-layer; and
   H) removing the 3D mold;
   wherein the volume ratio of the adipose tissue extract and the fibrinogen in the first solution is 3:1 to 5:1.

2. The method of claim 1, wherein Step B) to Step G) are accomplished within 30 minutes.

3. The method of claim 1, wherein the first filter is a syringe filter formed of stainless steel.

4. The method of claim 1, wherein, in Step C), the fiber-removed autologous adipose tissue is injected into a filter bag, and then an external pressure is applied to pass the fiber-removed autologous adipose tissue through the filter so as to crush the fiber-removed autologous adipose tissue.

5. The method of claim 1, wherein the fibrinogen in the first solution is a 40% to 60% dilution of 60 IU fibrinogen.

6. The method of claim 1, wherein the thrombin in the second solution is a 40% to 60% dilution of 500 IU thrombin.

7. The method of claim 1, wherein the first solution comprises at least one selected from the group consisting of insulin, insulin-like growth factors, granulocytes, lymphocytes, endothelial cells, monocytes, macrophages, adipose-derived stem cells, adipocytokines, adiponectin, leptin, IL-6, IL-1β, MCP-1 and PAI-1.

8. The method of claim 1, further comprising:
   forming an additional proto-layer by applying an additional first solution containing an adipose tissue extract, fibrinogen and keratinocytes onto the skin regeneration layer, and then applying an additional second solution containing thrombin onto the additional proto-layer to cure the proto-layer into an epidermal regeneration layer.

9. The method of claim 1, wherein the diabetic foot patient-specific skin regeneration sheet has a thickness of at least 1 mm.

* * * * *